(12) United States Patent
Saito et al.

(10) Patent No.: US 11,512,018 B2
(45) Date of Patent: Nov. 29, 2022

(54) OPTICAL FIBER MANUFACTURING METHOD AND OPTICAL FIBER MANUFACTURING APPARATUS

(71) Applicant: SUMITOMO ELECTRIC INDUSTRIES, LTD., Osaka (JP)

(72) Inventors: Takahiro Saito, Osaka (JP); Iwao Okazaki, Osaka (JP); Yoshihiro Morimoto, Tochigi (JP); Makoto Aoki, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 176 days.

(21) Appl. No.: 16/876,475

(22) Filed: May 18, 2020

(65) Prior Publication Data

US 2020/0369556 A1 Nov. 26, 2020

(30) Foreign Application Priority Data

May 23, 2019 (JP) .............................. JP2019-097120

(51) Int. Cl.
*C03B 37/027* (2006.01)
*C03B 37/029* (2006.01)

(52) U.S. Cl.
CPC ...... *C03B 37/02718* (2013.01); *C03B 37/029* (2013.01); *C03B 2205/50* (2013.01); *C03B 2205/55* (2013.01)

(58) Field of Classification Search
None
See application file for complete search history.

(56) References Cited

U.S. PATENT DOCUMENTS

| 4,514,205 A | * | 4/1985 | Darcangelo | C03B 37/02718 65/158 |
| 2003/0101773 A1 | * | 6/2003 | Lu | C03B 37/02718 65/434 |
| 2017/0217822 A1 | * | 8/2017 | Imase | C03B 37/0253 |

FOREIGN PATENT DOCUMENTS

| JP | H02-051441 | | 2/1990 | |
| JP | H08-259254 | | 10/1996 | |
| JP | 2012006797 A | * | 1/2012 | ....... C03B 37/02727 |
| JP | 2015071505 A | * | 4/2015 | ....... C03B 37/02718 |
| JP | 6037313 B2 | * | 12/2016 | ............... G03B 5/00 |

OTHER PUBLICATIONS

English Translation of JP2012-006797A Performed by Schreiber Translations Sep. 2022. (Year: 2022).*

* cited by examiner

*Primary Examiner* — Lisa L Herring
(74) *Attorney, Agent, or Firm* — IPUSA, PLLC

(57) ABSTRACT

An optical fiber manufacturing method includes a first process of passing a glass fiber through a fiber path. The fiber path is formed through a cooling tube that is housed in a first casing. The method also includes a second process of leading the glass fiber into a second casing before leading into the first casing. The first process includes supplying a first dry gas, having a dew point lower than the temperature of the cooling tube, into a first dry space formed between the first casing and the cooling tube. The second process includes supplying a second dry gas into a second dry space formed inside the second casing so as to cause air pressure in the second dry space to be higher than air pressure in an external space. The dew point of the second dry gas is lower than the dew point in the external space.

4 Claims, 8 Drawing Sheets

OPTICAL FIBER MANUFACTURING METHOD AND OPTICAL FIBER MANUFACTURING APPARATUS

CROSS-REFERENCE TO RELATED APPLICATIONS

This application is based on and claims priority to Japanese Patent Application No. 2019-097120, filed on May 23, 2019, the entire contents of which are incorporated herein by reference.

BACKGROUND OF THE INVENTION

1. Field of the Invention

The disclosures herein generally relate to an optical fiber manufacturing method and an optical fiber manufacturing apparatus.

2. Description of the Related Art

An optical fiber manufacturing method includes a process of heating and melting a glass preform in a drawing furnace so as to draw the glass preform into a linear glass fiber. The above process is referred to as a "drawing" process. The temperature of the glass fiber immediately after drawing is high. Thus, a protective resin cannot be applied to the glass fiber as it is. For this reason, immediately after the glass fiber is drawn, the glass fiber is cooled by a cooling device before the resin is applied (see Patent Document 1, for example).

The cooling device described in Patent Document 1 includes a cooling tube cooled by a coolant, and a casing that houses the cooling tube. The glass fiber is cooled when passing through a fiber path that extends through the cooling tube in the vertical direction. A space between the casing and the cooling tube is maintained under a dry atmosphere having a dew point lower than the temperature of the cooling tube. Therefore, small water drops due to the condensation of water vapor can be prevented from adhering to the glass fiber (see paragraph 0014 of Patent Document 1).

In a typical drawing apparatus, a glass fiber is exposed to outside air between a drawing furnace and a cooling device. If a glass fiber path between the drawing furnace and the cooling device is shut off from outside air, and the glass fiber is not exposed to outside air, hot air would flow from the drawing furnace into the cooling device, causing the performance of cooling the glass fiber in the cooling device to be significantly decreased.

Conversely, if glass fiber is exposed to outside air, outside air would be carried along with the glass fiber into the casing when the glass fiber is drawn into the casing of the cooling device. As the drawing speed of the glass fiber increases, outside air is more readily carried into the casing.

Outside air is air containing water vapor, and the dew point of outside air is higher than the temperature of a cooling tube. Therefore, frost or condensation may occur in the fiber path when water vapor contained in outside air is carried into the fiber path of the cooling tube.

RELATED-ART DOCUMENTS

Patent Documents

Patent Document 1: Japanese Laid-open Patent Publication No. 8-259254

SUMMARY OF THE INVENTION

According to an aspect of the present disclosure, a technology that reduces the formation of frost or water drops in a fiber path of a cooling tube is provided.

According to an aspect of the present disclosure, an optical fiber manufacturing method includes a first process of passing a glass fiber through a fiber path before applying a resin. The glass fiber is drawn from a glass preform, the fiber path is formed through a cooling tube, and the cooling tube is housed in a first casing and is cooled by a first coolant. The optical fiber manufacturing method includes a second process of leading the glass fiber into a second casing before leading the glass fiber into the first casing. The first process includes supplying a first dry gas into a first dry space formed between the first casing and the cooling tube. The dew point of the first dry gas is lower than the temperature of the cooling tube. The second process includes supplying a second dry gas into a second dry space formed inside the second casing so as to cause air pressure in the second dry space to be higher than air pressure in an external space of the first casing and the second casing. The dew point of the second dry gas is lower than the dew point in the external space.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
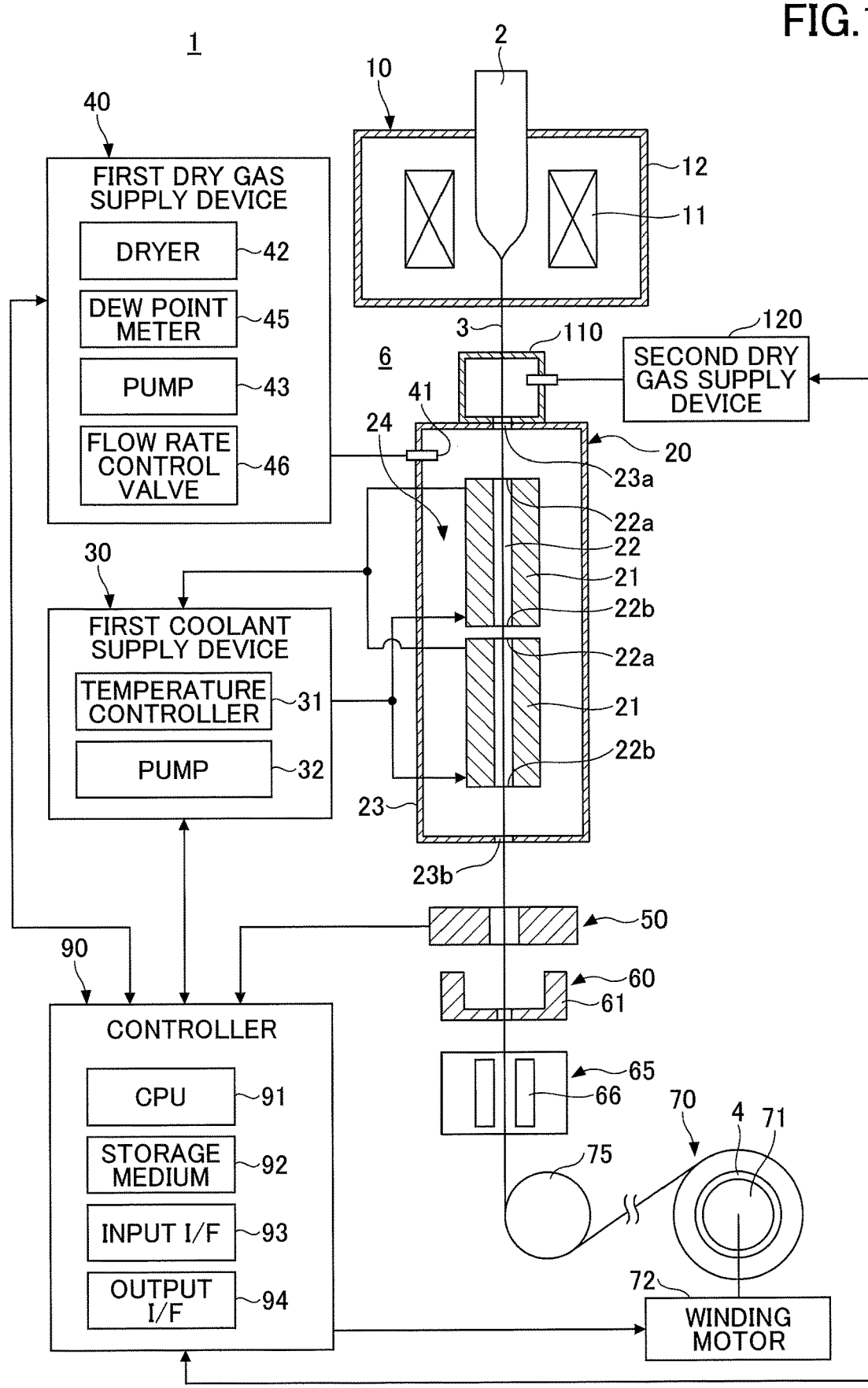
FIG. 1 is a diagram illustrating an optical fiber manufacturing apparatus according to an embodiment.

[Description of Embodiments of the Present Disclosure]

According to an aspect of the present disclosure, it is possible to reduce the formation of frost or water drops in a fiber path of a cooling tube.

First, embodiments of the present disclosure will be listed and described.

(1) According to an aspect of the present disclosure, an optical fiber manufacturing method includes a first process of passing a glass fiber through a fiber path before applying a resin. The glass fiber is drawn from a glass preform, the fiber path is formed through a cooling tube, and the cooling tube is housed in a first casing and is cooled by a first coolant. The optical fiber manufacturing method includes a second process of leading the glass fiber into a second casing before leading the glass fiber into the first casing. The first process includes supplying a first dry gas into a first dry space formed between the first casing and the cooling tube. The dew point of the first dry gas is lower than the temperature of the cooling tube. The second process includes supplying a second dry gas into a second dry space formed inside the second casing so as to cause air pressure in the second dry space to be higher than air pressure in an external space of the first casing and the second casing. The dew point of the second dry gas is lower than the dew point in the external space.

With the above-described optical fiber manufacturing method according to (1), it is possible to reduce the flow of outside air from the external space into the second dry space because the air pressure in the second dry space is higher than the air pressure in the external space. Further, gas carried along with the glass fiber into the second dry space can be replaced by the second dry gas. The dew point of the second dry gas is lower than the dew point in the external space. Therefore, the amount of water vapor in the second dry space can be made smaller than the amount of water vapor in the external space, and the amount of water vapor of gas carried along with the glass fiber from the second dry space into the first dry space can be made smaller than the amount of water vapor in the external space. Accordingly, it is possible to reduce the amount of water vapor of gas carried along with the glass fiber from the first dry space into the fiber path, thereby reducing the formation of frost or condensation in the fiber path.

(2) The first process according to (1) may include supplying the first dry gas into the first dry space so as to cause air pressure in the first dry space to be higher than the air pressure in the external space. The dew point of the first dry gas is lower than the temperature of the cooling tube. The second process according to (1) may include supplying the second dry gas into the second dry space so as to cause the air pressure in the second dry space to be higher than the air pressure in the first dry space. The dew point of the second dry gas is lower than the dew point in the external apace and the temperature of the cooling tube.

With the above-described optical fiber manufacturing method according to (2), it is possible to minimize the flow of outside air from the external space into the first dry space because the air pressure P1 in the first dry space is higher than the air pressure P0 in the external space. Further, the air pressure P2 in the second dry space is higher than the air pressure P1 in the first dry space. Therefore, the differential pressure ΔP2 between the air pressure P2 and the air pressure P0 becomes greater than the differential pressure ΔP1 between the air pressure P1 and the air pressure P0. Accordingly, it is possible to further restrict the flow of outside air from the external space into the first dry space through the second dry space. In order for outside air to flow from the external space into the first dry space through the second dry space, the outside air would need to flow against the differential pressure ΔP2 that is greater than the differential pressure ΔP1. When the first casing and the second casing contact each other, the effect of restricting the flow of outside air from the external space into the first dry space through the second dry space can be remarkably obtained.

Further, with the above-described optical fiber manufacturing method according to (2), the air pressure in the second dry space is higher than the air pressure in the first dry space. Therefore, the second dry gas flows from the second dry space into the first dry space. Accordingly, it is possible to increase the air pressure in the first dry space, thereby increasing the differential pressure between the air pressure in the first dry space and the air pressure in the external space. Thus, it is possible to restrict the flow of outside air into the first dry space from the external space vie gaps between members constituting the first casing 23. Further, the dew point of the second dry gas is lower than the temperature of the cooling tube. Therefore, even when the second dry gas is cooled by the cooling tube, frost or condensation does not occur.

(3) According to an aspect of the present disclosure, an optical fiber manufacturing method includes a first process of passing a glass fiber through a fiber path before applying a resin. The glass fiber is drawn from a glass preform, the fiber path is formed through a cooling tube, and the cooling tube is housed in a first casing and is cooled by a first coolant. The optical fiber manufacturing method includes a second process of leading the glass fiber into a second casing before leading the glass fiber into the first casing. The first process includes supplying a first dry gas into a first dry space formed between the first casing and the cooling tube. The dew point of the first dry gas is lower than the temperature of the cooling tube. The second process includes causing an adsorber disposed in the second dry space to adsorb water vapor carried along with the glass fiber from the external space of the first casing and the second casing into the second dry space of the second casing.

With the above-described optical fiber manufacturing method according to (3), the adsorber disposed in the second dry space adsorbs water vapor carried along with the glass fiber from the external space into the second dry space. Therefore, the amount of water vapor in the second dry space can be made smaller than the amount of water vapor in the external space, and the amount of water vapor of gas carried along with the glass fiber from the second dry space into the first dry space can be made smaller than the amount of water vapor in the external space. Accordingly, it is possible to reduce the amount of water vapor of gas carried along with the glass fiber from the first dry space into the fiber path, thereby reducing the formation of frost or condensation in the fiber path.

(4) The second process according to (3) may include causing a cooler, serving as the adsorber, to cool and adsorb the water vapor carried along with the glass fiber from the external space into the second dry space. The second process according to (3) may include controlling the temperature of a second coolant that cools the cooler, so as to cause the temperature of the cooler to be lower than the temperature of the cooling tube.

With the above-described optical fiber manufacturing method according to (4), the dew point in the second dry space is reduced to approximately the same temperature as the temperature of the cooler. The temperature of the cooler is lower than the temperature of the cooling tube, thus allowing the dew point in the second dry space to be lower than the temperature of the cooling tube. Further, the dew point of gas carried along with the glass fiber from the second dry space into the first dry space can be made lower than the temperature of the cooling tube. Accordingly, the dew point of gas carried along with the glass fiber from the first dry space into the fiber path can be made lower than the temperature of the cooling tube, thereby reducing the formation of frost or condensation in the fiber path.

(5) The second process according to (3) or (4) may include causing an adsorbent made of a porous material, serving as the adsorber, to adsorb water vapor carried along with the glass fiber from the external space into the second dry space.

With the above-described optical fiber manufacturing method according to (5), the adsorbent made of the porous material is used. Therefore, it is possible to eliminate the necessity of cooling, thus allowing water vapor to be more readily adsorbed.

(6) According to an aspect, of the present disclosure, an optical fiber manufacturing apparatus includes a drawing furnace, a cooling device, a first coolant supply device, a first dry gas supply device, a second casing, a second dry gas supply device, and an applying device. The drawing furnace is configured to heat and melt a glass preform so as to draw a linear glass fiber from the glass preform. The cooling device includes a cooling tube cooled by a first coolant, a fiber path formed through the cooling tube and through which the glass fiber passes, and a first casing that houses the cooling tube. The first coolant supply device includes a temperature controller configured to control the temperature of the first coolant and a pump configured to supply the first coolant from the temperature controller to the cooling tube. The first dry gas supply device is configured to supply a first dry gas into a first dry space formed between the first casing and the cooling tube. The dew point of the first dry gas is lower than the temperature of the cooling tube. The second casing includes a second dry space through which the glass fiber passes before passing through the first dry space. The second dry gas supply device is configured to supply a second dry gas into the second dry space so as to cause air pressure in the second dry space to be higher than air pressure in an external space of the first casing and the second casing. The dew point of the second dry gas is lower than the dew point in the external space. The applying device is configured to apply a resin to the glass fiber cooled by the cooling device.

With the above-described optical fiber manufacturing apparatus according to (6), an effect similar to that of the above-described optical fiber manufacturing method according to (1) can be obtained.

(7) According to an aspect of the present disclosure, an optical fiber manufacturing apparatus includes a drawing furnace, a cooling device, a first coolant supply device, a first dry gas supply device, a second casing, an adsorber, and an applying device. The drawing furnace is configured to heat and melt a glass preform so as to draw a linear glass fiber from the glass preform. The cooling device includes a cooling tube cooled by a first coolant, a fiber path formed through the cooling tube and through which the glass fiber passes, and a first casing that houses the cooling tube. The first coolant supply device includes a temperature controller configured to control the temperature of the first coolant, and also includes a pump configured to supply the first coolant from the temperature controller to the coding tube. The first dry gas supply device is configured to supply a first dry gas into a first dry space formed between the first casing and the cooling tube. The dew point of the first dry gas is lower than the temperature of the cooling tube. The second casing includes a second dry space through which the glass fiber passes before passing through the first dry space. The adsorber is disposed in the second dry space to adsorb water vapor carried along with the glass fiber into the second dry space. The applying device is configured to apply a resin to the glass fiber cooled by the cooling device.

With the above-described optical fiber manufacturing apparatus according to (7), an effect similar to that of the above-described optical fiber manufacturing method according to (3) can be obtained.

[Details of Embodiments of Present Disclosure]

In the following, embodiments of the present disclosure will be described. In the following description, the same or corresponding elements are denoted by the same reference numerals, and a description thereof may be omitted.

[Optical Fiber Manufacturing Apparatus]

FIG. 1 is a diagram illustrating an optical fiber manufacturing apparatus according to an embodiment. An optical fiber manufacturing apparatus 1 includes a drawing furnace 10, a cooling device 20, a first coolant supply device 30, a first dry gas supply device 40, an outer diameter measuring instrument 50, a resin applying device 60, a resin curing device 65, a winding device 70, and a controller 90.

The drawing furnace 10 heats and melts a glass preform 2 so as to draw a linear glass fiber 3 from the glass preform 2. The glass preform 2 is formed in a bar shape beforehand, and has a refractive index distribution in the radial direction. The glass preform 2 is suspended such that the longitudinal direction of the glass preform 2 is the vertical direction.

The glass fiber 3 is drawn linearly from the lower end of the glass preform 2, and is suspended. Similar to the glass preform 2, the glass fiber 3 has a refractive index distribution in the radial direction. The glass fiber 3 includes a core and a cladding that surrounds the outer periphery of the core. The refractive index of the core is larger than the refractive index of the cladding.

The drawing furnace 10 includes a heat source 11 that heats and melts the glass preform 2, and a furnace body 12 that houses the heat source 11. The heat source 11 may be an electric heater. Note that the heat source 11 may be configured by a coil and a conductor, when a current is applied to the coil by a high-frequency power source, the coil forms a magnetic field around the conductor, and an eddy current flows in the conductor, thereby causing the conductor to generate heat.

The furnace body 12 has an inlet at the upper end of the furnace body 12. The glass preform 2 is inserted from the inlet of the furnace body 12 into the inside of the furnace body 12. Further, the furnace body 12 has an outlet at the lower end of the furnace body 12. The glass fiber 3 is led out to the outside of the furnace body 12 from the outlet of the furnace body 12. An inert gas such as helium or argon is supplied into the furnace body 12.

Because the temperature of the glass fiber 3 immediately after drawing is high, a protective resin cannot be applied to the glass fiber 3 as it is. For this reason, immediately after the glass fiber 3 is drawn, the glass fiber 3 is cooled by the cooling device 20 before the resin is applied. The cooling device 20 is disposed vertically below the drawing furnace 10.

The cooling device 20 includes cooling tubes 21 cooled by a first coolant, and a fiber path 22 formed through each of the cooling tubes 21. The fiber path 22 extends through each of the cooling tubes 21 in the vertical direction. An inlet 22a of the fiber path 22 is formed on the upper surface of each of the cooling tubes 21. An outlet 22b of the fiber path 22 is formed on the lower surface of each of the cooling tubes 21. The fiber path 22 is a path through which the glass fiber 3 passes. The glass fiber 3 travels from the inlet 22a of the fiber path 22 toward the outlet 22b of the fiber path 22.

The plurality of cooling tubes 21 are arranged in a line in the vertical direction. By arranging the plurality of short cooling tubes 21, manufacturing costs can be reduced. Manufacturing costs can be reduced by separately manufacturing short members and connecting the members together, rather than manufacturing a single long member. In addition, the temperature may be changed for each of the cooling tubes 21. The temperature(s) of the cooling tubes 21 are approximately the same as the temperature of the first coolant.

The cooling device 20 includes a first casing 23 that houses the cooling tubes 21. A first dry space 24 is defined by the first casing 23 and the cooling tubes 21. The first dry space 24 is formed inside the first casing 23 and also outside the cooling tubes 21. A first dry gas having a dew point lower than the temperature(s) of the cooling tubes 21 is supplied into the first dry space 24.

The dew point is the temperature at which water vapor starts to condensate into water when a gas containing water vapor is cooled. In a case of the dew point being below 0° C., water vapor starts to condensate into water and the water starts to freeze into ice when a gas containing water vapor is cooled to the dew point.

In the present embodiment, the dew point is measured at the same air pressure as air pressure P1 in the first dry space 24. This is because the present disclosure is intended to reduce the formation of frost or condensation in the first dry space 24. The air pressure P1 in the first dry space 24 is higher than air pressure P0 in an external space 6, as will be described later.

The external space 6 is a space outside the first casing 23 and a second casing 110, which will be described later. Typically, the external space 6 is filled with air. The air pressure P0 in the external space 6 is atmospheric pressure.

The differential pressure ΔP1 between the air pressure P1 in the first dry space 24 and the air pressure P0 in the external space 6 (ΔP1=P1−P0) is typically 1% or less of the air pressure P0 in the external space 6. Therefore, the dew point may be measured at the air pressure P0 in the external space 6, namely at atmospheric pressure. If the differential pressure ΔP1 is 1% or less of atmospheric pressure, the difference in dew point caused by the differential pressure ΔP1 is negligibly small.

As described above, the plurality of cooling cubes 21 are arranged in a line in the vertical direction. There may be a case where the plurality of cooling tubes 21 are controlled at different temperatures. For example, a cooling tube 21 located at the lower side may be controlled at a temperature lower than that of a cooling tube 21 located at the upper side. If the plurality of cooling tubes 21 are controlled at different temperatures, the first dry gas having a dew point lower than the lowest temperature of a cooling tube 21 is supplied into the first dry space 24.

The first casing 23 maintains the first dry gas in the surroundings of the cooling tubes 21. In the present embodiment, dry air is used as the first dry gas; however, nitrogen gas may be used. The dew point of the first dry gas is lower than the temperature(s) of the cooling tubes 21. Accordingly, even if the first dry gas is cooled, it is possible to prevent the formation of frost or condensation on the cooling tubes 21, and thus possible to prevent the breakage of the glass fiber 3 due to such frost or condensation. Note that frost occurs when the temperature(s) of the cooling tubes 21 are 0° C. or below, and condensation occurs when the temperature(s) of the cooling tubes 21 are above 0° C.

As described above, the air pressure P1 in the first dry space 24 is slightly higher than the air pressure P0 in the external space 6. The differential pressure ΔP1 enables the restriction of the flow of outside air from the external space 6 into the first dry space 24. By restricting the flow of outside air from the external space 6 into the first dry space 24, it is possible to reduce the flow of water vapor from the external space 6 into the first dry space 24, thereby reducing the formation of frost or condensation on the cooling tubes 21.

The first casing 23 includes an inlet 23a at the upper end of the first casing 23. The glass fiber 3 is led from the inlet 23a of the first casing 23 into the inside of the first casing 23. In addition, the first casing 23 includes an outlet 23b at the lower end of the first casing 23. The glass fiber 3 is led out to the outside of the first casing 23 from the outlet 23b of the first casing 23.

The glass fiber 3 is led from the inlet 23a of the first casing 23 toward the outlet 23b of the outlet 23b, and passes through the fiber path 22 of each of the cooling tubes 21 on the way. The temperature of the glass fiber 3 at the inlet 23a of the first casing 23 is, for example, approximately 1200° C. The temperature of the glass fiber 3 at the outlet 23b of the first casing 23 is, for example, approximately 50° C.

The glass fiber 3 is cooled by 1000° C. or more between the inlet 23a of the first casing 23 and the outlet 23b of the first casing 23. At least some of the cooling tubes 21 are cooled by the first coolant at a temperature lower than 0° C. such that the glass fiber 3 is rapidly cooled.

Figure 2:
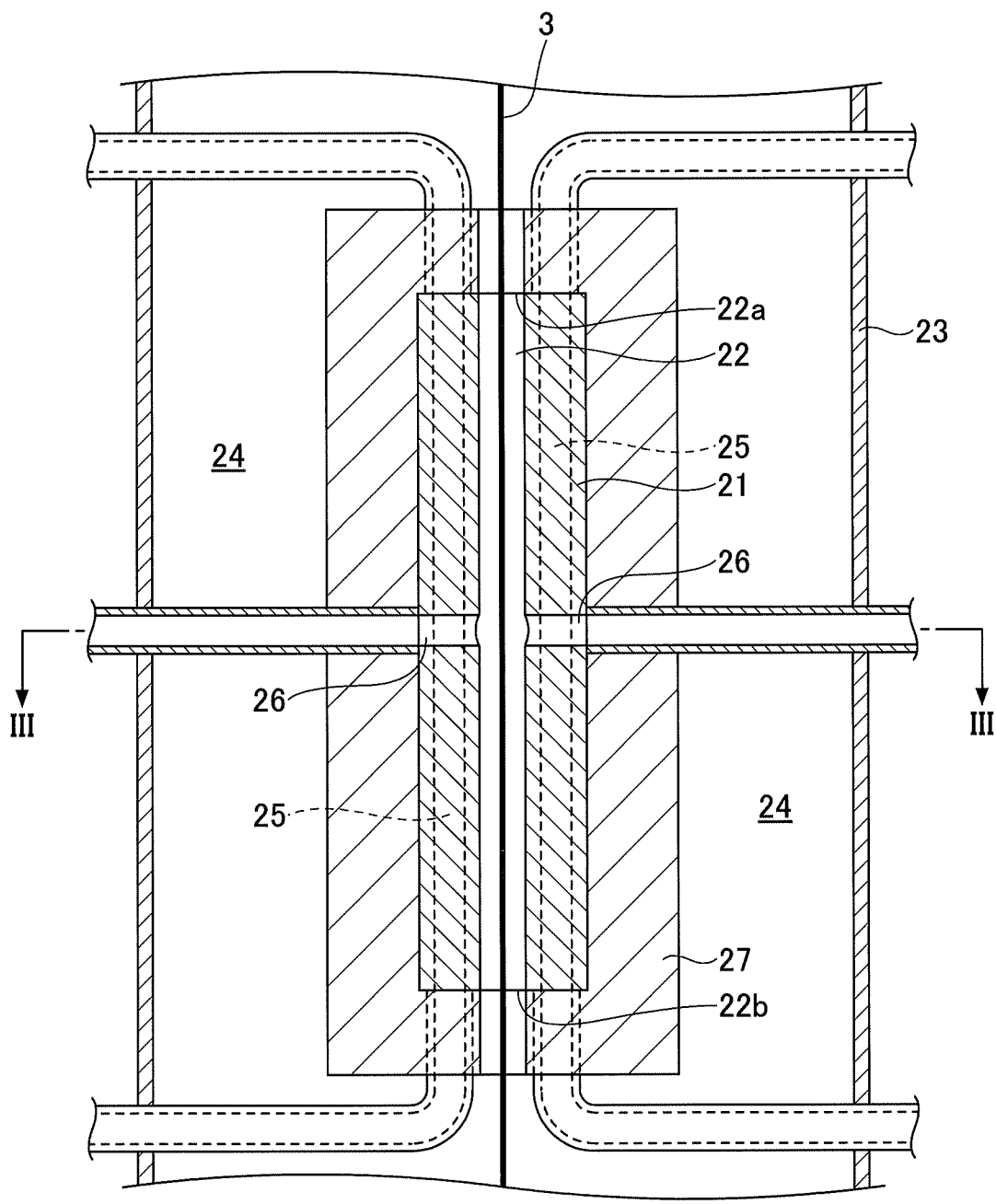
FIG. 2 is a cross-sectional view of a cooling tube and a first casing according to an embodiment.
Figure 3:
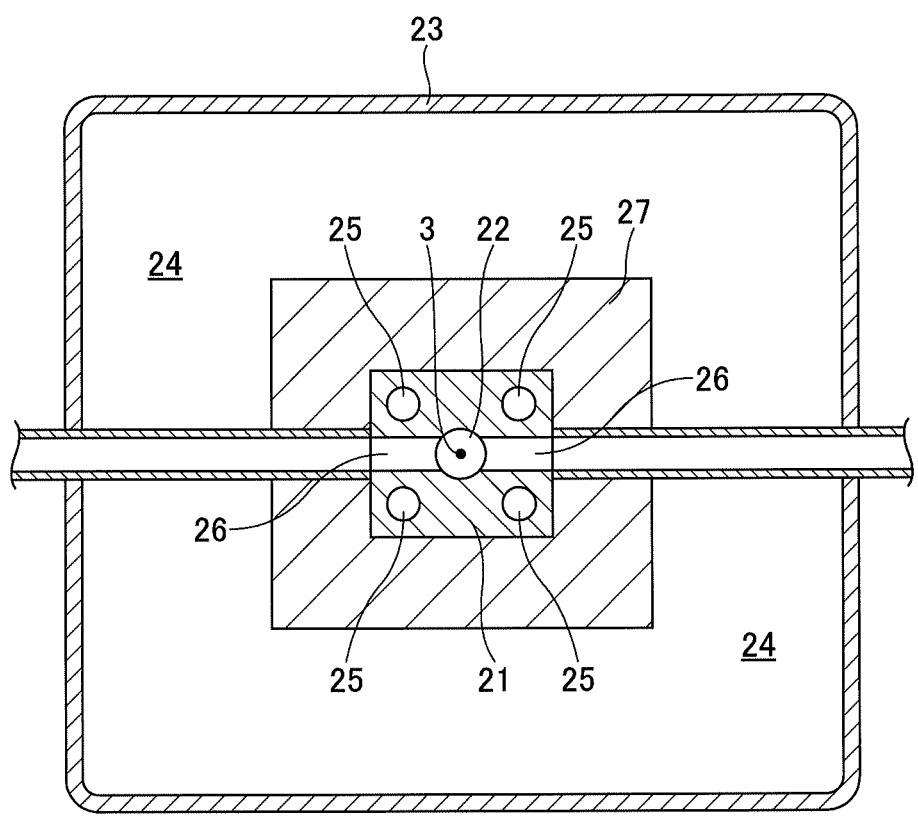
FIG. 3 is a cross-sectional view of the cooling tube and the first casing taken through III-III of FIG. 2.

FIG. 2 is a cross-sectional view of a cooling tube and a first casing according to an embodiment. FIG. 3 is a cross-sectional view of the cooling tube and the first casing taken through III-III of FIG. 2.

The cooling device 20 includes first coolant passages 25 formed in a cooling tube 21. Portions of the first coolant passages 25 are formed along a fiber path 22. As illustrated in FIG. 3, the four first coolant passages 25 may be formed In the surroundings of the fiber path 22. Mote that the number of first coolant passages 25 is not particularly limited.

The cooling device 20 includes heat transfer gas supply paths 26 formed in the cooling tube 21. The heat transfer gas supply paths 26 supply a heat transfer gas into the fiber path 22. The heat transfer gas promotes cooling of the glass fiber 3 by transferring heat from the high-temperature glass fiber 3 to the low-temperature cooling tube 21. Examples of the heat transfer gas used include He gas.

The dew point of the heat transfer gas is lower than the temperature of the cooling tube 21. For example, the heat transfer gas may be supplied into the fiber path 22 via the heat transfer gas supply paths 26 after passing through a gas tube cooled by liquid nitrogen. In this case, the dew point of the heat transfer gas is approximately the same as the boiling point of liquid nitrogen (−196° C.).

The heat transfer gas supply paths 26 are horizontally disposed. As illustrated in FIG. 3, the pair of heat transfer gas supply paths 26 are disposed, with the fiber path 22 being interposed therebetween. Note that the heat transfer gas supply paths 26 may be radially disposed around the fiber path 22 when viewed from the vertical direction.

The heat transfer gas is supplied from the center in the vertical direction of the fiber path 22 into the fiber path 22. The flow of heat transfer gas branches into an upward flow and a downward flow at the center in the vertical direction of the fiber path 22.

The heat transfer gas passes through the inlet 22a of the fiber path 22 and the outlet 22b of the fiber path 22, and is discharged into the first dry space 24 formed between the first casing 23 and the cooling tube 21. Then, the heat transfer gas is discharged to the outside of the first casing 23. Note that the heat transfer gas may be recovered and reused. The pressure of the fiber path 22 is approximately the same as the air pressure P1 in the first dry space 24, or is slightly higher than the air pressure P1 in the first dry space 24.

In addition t.o the cooling tube 21 and the first casing 23, the cooling device 20 includes a heat insulator 27. The heat insulator 27 increases cooling efficiency by restricting heat transfer from the first dry gas, which has been supplied into the first casing 23, to the cooling tube 21. The heat insulator 27 covers the surface of the cooling tube 21, except for portions facing the fiber path 22. The heat insulator 27 is disposed so as not to interfere with the glass fiber 3.

As illustrated in FIG. 1, the first coolant supply device 30 includes a temperature controller 31 and a pump 32. The temperature controller 31 controls the temperature of the first coolant, and the pump 32 supplies the first coolant from the temperature controller 31 to the cooling tube 21. Examples of the first coolant include a coolant that is in a liquid phase at a temperature ranging from at least −70° C. or more to room temperature (for example, 20° C.) or less. Specific examples of the first coolant include perfluoropolyether.

The first coolant is cooled to a set temperature by the temperature controller 31, and is then supplied to the cooling tube 21 by the pump 32. The first coolant is returned to the first coolant supply device 30 after absorbing heat transferred from the high-temperature glass fiber 3 to the low-temperature cooling tube 21. Then, the first coolant is cooled to the set temperature again by the temperature controller 31, and is supplied to the cooling tube 21 by the pump 32.

The first dry gas supply device 40 supplies the first dry gas, having a dew point lower than the temperature of the cooling tube 21, into the first dry space 24 formed between the first casing 23 and the cooling tube 21. A first dry gas inlet 41 is disposed facing the first dry space 24 and near the inlet 23a of the first casing 23. By supplying the first dry gas, it is possible to restrict the flow of outside air into the first casing 23.

The first dry gas supply device 40 includes a dryer 42 and a pump 43. The dryer 42 generates the first dry gas by reducing water vapor contained in a source gas of the first dry gas. The pump 43 supplies the first dry gas from the dryer 42 into the first casing 23. Examples of the source gas of the first dry gas include air. In this case, dry air is generated as the first dry gas. The content of water vapor is reduced by, for example, the adsorption of water vapor.

The first dry gas supply device 40 includes a dew point meter 45 that measures the dew point of the first dry gas generated by the dryer 42. The dew point meter 45 is installed at the dryer 42. The first dry gas is dried to a preset dew point by the dryer 42, and then supplied from the dryer 42 into the first casing 23 by the pump 43.

The first dry gas supply device 40 includes a flow rate control valve 46 that controls the flow rate of the first dry gas supplied into the first casing 23. After the first dry gas is supplied into the first casing 23, the first dry gas passes through the outlet 23b of the first casing 23, and is discharged to the outside of the first casing 23. In the present embodiment, the air pressure P1 in the first dry space 24 is lower than air pressure P2 in a second dry space 111, which will be described later. Therefore, the first dry gas flows downward.

The outer diameter measuring instrument 50 measures the outer diameter of the glass fiber 3 cooled by the cooling device 20. The outer diameter of the glass fiber 3 refers to the outer diameter of the cladding. For example, the outer diameter measuring instrument 50 measures the outer diameter of the glass fiber 3 by irradiating the glass fiber 3 with a light flux and capturing an image of the light flux that has passed through the glass fiber 3. The drawing speed of the glass fiber 3 is controlled, such that a measured value of the outer diameter measuring instrument 50 is a set value (125 μm, for example).

The resin applying device 60 applies a resin to the glass fiber 3. The resin applying device 60 includes a die 61 with which a liquid resin is stored and applied. When the glass fiber 3 passes through the die 61, the resin is applied to the outer peripheral surface of the glass fiber 3. Examples of the resin include an ultraviolet curing resin cured by ultraviolet light.

The resin curing device 65 cures the resin applied to the outer peripheral surface of the glass fiber 3. For example, when an ultraviolet curing resin is cured, the resin curing device 65 includes an ultraviolet lamp 66 that irradiates ultraviolet light. When the glass fiber 3 passes beside the ultraviolet lamp 66, the resin applied to the outer peripheral surface of the glass fiber 3 is cured.

Note that a thermosetting resin may be used instead of the ultraviolet curing resin. A plurality of resins may be overlaid on the outer peripheral surface of the glass fiber 3. That is, a plurality of resin layers may be laminated on the outer peripheral surface of the glass fiber 3.

The winding device 70 includes a winding bobbin holder 71 and a winding motor 72. The winding bobbin holder 71 removably holds a winding bobbin 4 on which the glass fiber 3 is wound, and the winding motor 72 rotates the winding bobbin holder 71. After the glass fiber 3 passes through the resin curing device 65, the glass fiber 3 is redirected by the guide roller 75, and is finally wound by the winding bobbin 4. Note that, after the glass fiber 3 is drawn from the glass preform 2, the glass fiber 3 travels downward in the vertical direction until the glass fiber 3 is redirected by the guide roller 75.

The controller 90 is configured by a computer, for example. As illustrated in FIG. 1, the controller 90 includes a central processing unit (CPU) 91, a storage medium 92 such as a memory, an input interface 93, and an output interface 94. The controller 90 controls the operation of the optical fiber manufacturing apparatus 1 by causing the CPU 91 to execute a program stored in the storage medium 92. Further, the controller 90 receives signals from external devices via the input interface 93 and transmits signals to external devices via the output interface 94.

The glass fiber 3 is exposed to outside air between the drawing furnace 10 and the cooling device 20. If a path of the glass fiber 3 from the drawing furnace 10 to the cooling device 20 is shut off from outside air, and the glass fiber 3 is not exposed to outside air, hot air would flow from the drawing furnace 10 into the cooling device 20. As a result, the performance of cooling the glass fiber 3 in the cooling device 20 would be significantly decreased.

When the glass fiber 3 is led into the first casing 23 of the cooling device 20, outside air may be carried along with the glass fiber 3 into the first casing 23. As the drawing speed of the glass fiber 3 increases, outside air is more readily carried into the first casing 23.

In particular, when the drawing speed of the glass fiber 3 is 1000 m/min or more, outside air is readily carried into the first casing 23. The drawing speed of the glass fiber 3 is 600 m/min to 2500 m/min, for example.

Outside air is air that contains water vapor. The dew point of outside air is higher than the temperature of the cooling tube 21. Therefore, when outside air is carried along with the glass fiber 3 into the fiber path 22 of the cooling tube 21, water vapor is carried into the fiber path 22.

The inventors of the present invention investigated the reason for the breakage of a glass fiber, and found that water vapor carried into a fiber path causes the breakage of the glass fiber. That is, if water vapor is carried into the fiber path, frost or condensation would occur in the fiber path, thereby causing the breakage of the glass fiber.

The optical fiber manufacturing apparatus 1 includes the second casing 110. The second dry space 111 is formed inside the second casing 110, and the glass fiber 3 passes through the second dry space 111 before the first dry space 24. The glass fiber 3 is exposed to the second dry gas supplied into the second dry space 111, and gas carried along with the glass fiber 3 into the second dry space 111 is replaced by the second dry gas. The dew point of the second dry gas is lower than the dew point in the external space 6, which will be described in detail later. Therefore, the amount of water vapor in the second dry space 111 can be made smaller than the amount of water vapor in the external space 6. Accordingly, it is possible to reduce the amount of water vapor of gas carried along with the glass fiber 3 from, the first dry space 24 into the fiber path 22.

Figure 4:
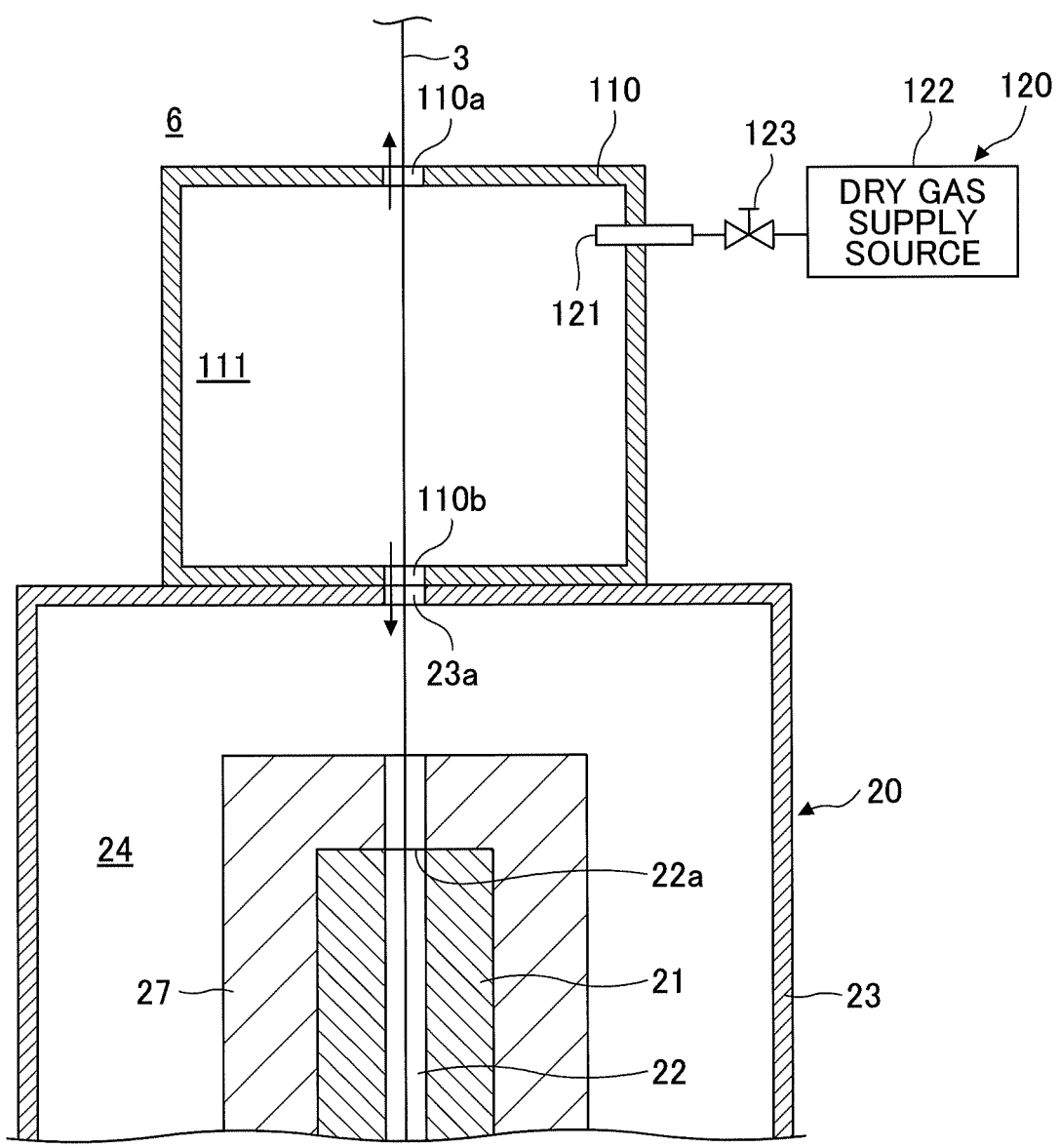
FIG. 4 is a cross-sectional view of the first casing, a second casing, and a second dry gas supply device according to an embodiment.

FIG. 4 is a cross-sectional view of the first casing, the second casing, and the second dry gas supply device according to an embodiment. In FIG. 4, arrows each indicate the flow of the second dry gas. The same applies to FIG. 5.

The second casing 110 includes an inlet 110a at the upper end of the second casing 110. The glass fiber 3 is led from the inlet 110a into the second casing 110. In addition, the second casing 110 includes an outlet 23b at the lower end of the second casing 110. The glass fiber 3 is led to the outside of the second casing 110 from the outlet 110b.

Figure 5:
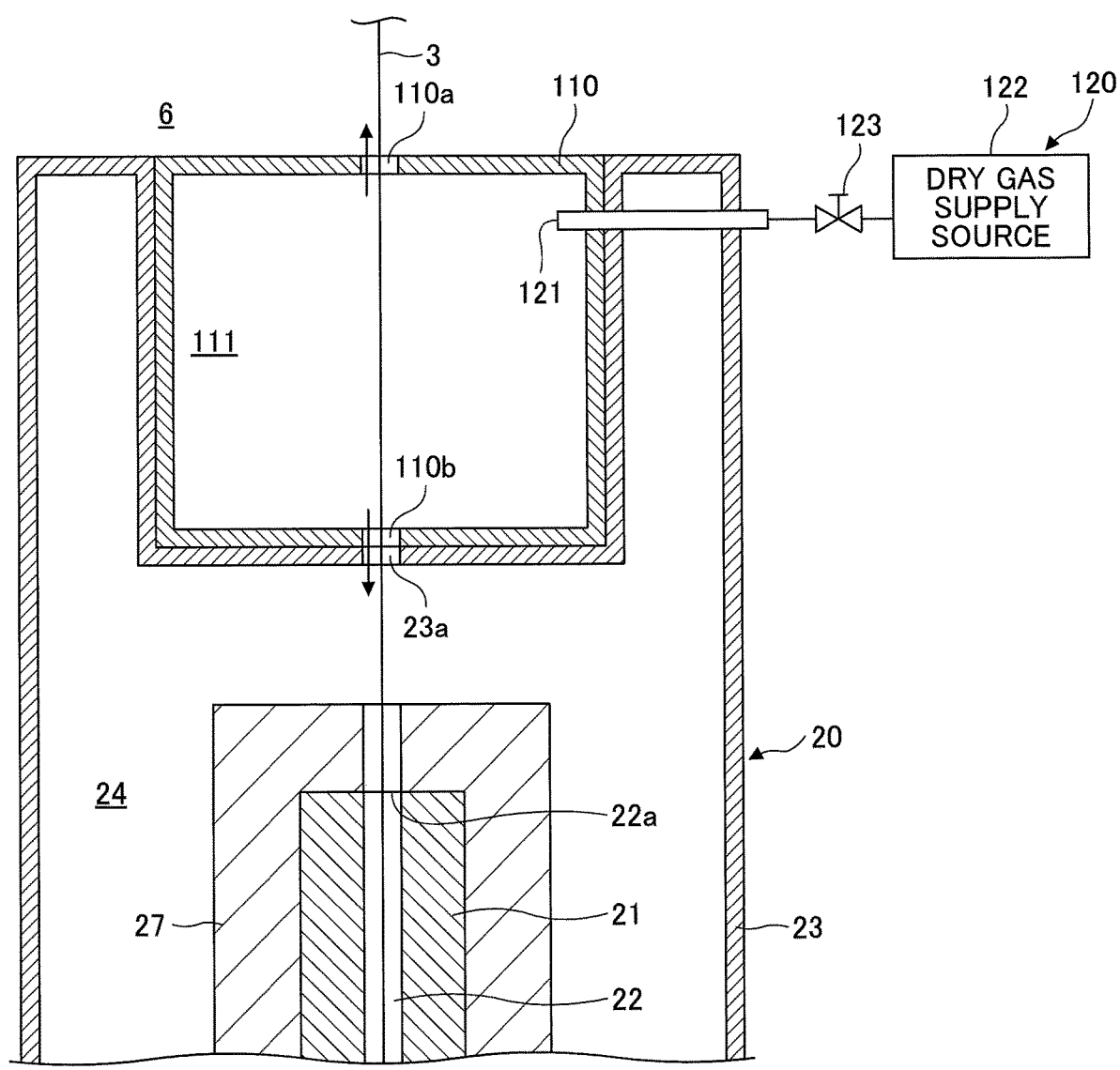
FIG. 5 is a cross-sectional view of a variation of the first casing and the second casing of FIG. 4.

The second casing 110 is disposed on the first casing 23. For example, the second casing 110 is disposed on a horizontal top plate of the first casing 23. As illustrated in FIG. 5, a recess may be formed on the top plate of the first casing 23, and the second casing 110 may be placed in the recess.

The second casing 110 contacts the first casing 23. The outlet 110b of the second casing 110 and the inlet 23a of the first casing 23 are continuously formed. The glass fiber 3 enters the inlet 23a of the first casing 23 immediately after exiting the outlet 110b of the second casing 110. Therefore, the amount of water vapor of gas carried along with the glass fiber 3 does not increase before entering the inlet 23a of the first casing 23.

In the present embodiment, the second casing 110 contacts the first casing 23, and is disposed without being spaced apart from the first casing 23. However, the second casing 110 may be disposed at a distance away from the first casing 23. The distance between the first casing 23 and the second casing 110 may be any distance that allows the amount of water vapor of gas carried along with the glass fiber 3 to be maintained to be less than the amount of water vapor in the external space 6, while the glass fiber 3 passes between the first casing 23 and the second casing 110.

The second dry gas supply device 120 supplies the second drying gas, whose dew point is lower than the dew point in the external space 6, into the second dry space 111 so as to cause the air pressure P2 in the second dry space 111 to be higher than the air pressure P0 in the external space 6. Accordingly, it is possible to minimize the flow of outside air from the external space 6 into the second dry space 111. Further, gas carried along with the glass fiber 3 into the second dry space 111 can be replaced by the second dry gas. The dew point of the second dry gas is lower than the dew point in the external space 6. Therefore, the amount of water vapor in the second dry space 111 can be made smaller than the amount of water vapor in the external space 6, and the amount of water vapor of gas carried along with the glass fiber 3 from the second dry space 111 into the first dry space 24 can be reduced. Accordingly, it is possible to reduce the amount of water vapor of gas carried along with the glass fiber 3 from the first dry space 24 into the fiber path 22, thereby reducing the formation of frost or condensation in the fiber path 22. As described above, the dew point of the second dry gas is measured at the same pressure as the air pressure P1 in the first dry space 24. However, as described above, the dew point of the second dry gas may be measured at the air pressure P0 in the external space 6, namely at atmospheric pressure, as long as the differential pressure ΔP1 (ΔP1=P1−P0) is 1% or less of the air pressure P0 in the external space 6.

An inlet 121 of the second dry gas faces the second dry space 111, and is disposed near the inlet 110a of the second casing 110, for example. Outside air carried along with the glass fiber 3 through the inlet 110a of the second casing 110 into the second casing 110 can be further restricted by disposing the inlet 121 near the inlet 110a.

The second dry gas supply device 120 includes a dry gas supply source 122. The dry gas supply source 122 may be a dryer, for example. The dryer generates the second dry gas by reducing the amount of water vapor contained in a source gas of the second dry gas. As the second dry gas, dry air may be used.

Note that the dry gas supply source 122 may supply nitrogen gas, serving as the second dry gas, into the second dry space 111. When nitrogen gas evaporated from liquid nitrogen is used, the dew point of the nitrogen gas is approximately the same as the boiling point of the liquid nitrogen (approximately −196° C.), which is significantly lower than the dew point in the external space 6. Therefore, the amount of water vapor in the second dry space 111 can be significantly made smaller than the amount of water vapor in the external space 6.

The second dry gas supply device 120 includes a pressure control valve 123 that controls the pressure of the second dry gas supplied into the second casing 110. The pressure control valve 123 may be a pressure reducing valve, for example. The pressure control valve 123 can maintain the air pressure P2 in the second dry space 111 constant, and can maintain the differential pressure ΔP2 (ΔP2=P2−P0) between the air pressure P2 in the second dry space 111 and the air pressure P0 in the external space 6 constant. The differential pressure ΔP2 is larger than 0 Pa and less than or equal to 0.3 MPa, for example.

The air pressure P2 in the second dry space 111 is higher than the air pressure P0 in the external space 6. The air pressure P2 in the second dry space 111 may be lower than the air pressure P1 in the first dry space 24; however, in the present embodiment, the air pressure P2 in the second dry space 111 is higher than the air pressure P1. When the air pressure P2 is higher than the air pressure P1, the differential pressure ΔP2 between the air pressure P2 and the air pressure P0 becomes greater than the differential pressure ΔP1. Accordingly, it is possible to further restrict the flow of outside air from the external space 6 into the first dry space 24 through the second dry space 111. In order for outside air to flow from the external space 6 into the first dry space 24 through the second dry space 111, the outside air would need to flow against the differential pressure ΔP2 that is greater than the differential pressure ΔP1. The effect of restricting the flow of outside air from the external space 6 into the first dry space 24 through the second dry space 111 can be remarkably obtained, particularly when the first casing 23 and the second casing 110 contact each other.

The air pressure P2 in the second dry space 111 is higher than the air pressure P1 in the first dry space 24. Therefore, the second dry gas flows from the second dry space 111 into the first dry space 24, thereby increasing the air pressure P1 in the first dry space 24. Accordingly, the differential pressure ΔP1 between the air pressure P1 in the first dry space 24 and the air pressure P0 in the external space 6 can be increased. The differential pressure ΔP1 is higher than 0 Pa and less than or equal to 100 Pa, for example. Because the air pressure P1 is higher than the air pressure P0, it is possible to reduce the flow of outside air from the external space 6 into the first dry space 24 through gaps between members constituting the first casing 23. Further, the dew point of the second dry gas is lower than the temperature of the cooling tube 21. Therefore, even when the second dry gas flows into the first dry space 24 and is cooled by the cooling tube 21, frost or condensation does not occur.

The volume of the second dry space 111 is smaller than the volume of the first dry space 24. For example, the dimension in the vertical direction of the second dry space 111 is smaller than the dimension in the vertical direction of the first dry space 24. Further, the diameter of the second dry space 111 is smaller than the diameter of the first dry space 24 when viewed in the vertical direction. When the volume of the second dry space 111 is smaller than the volume of the first dry space 24, the air pressure P2 in the second dry space 111 can be readily made higher than the air pressure P1 in the first dry space 24.

[Optical Fiber Manufacturing Method]

Figure 6:
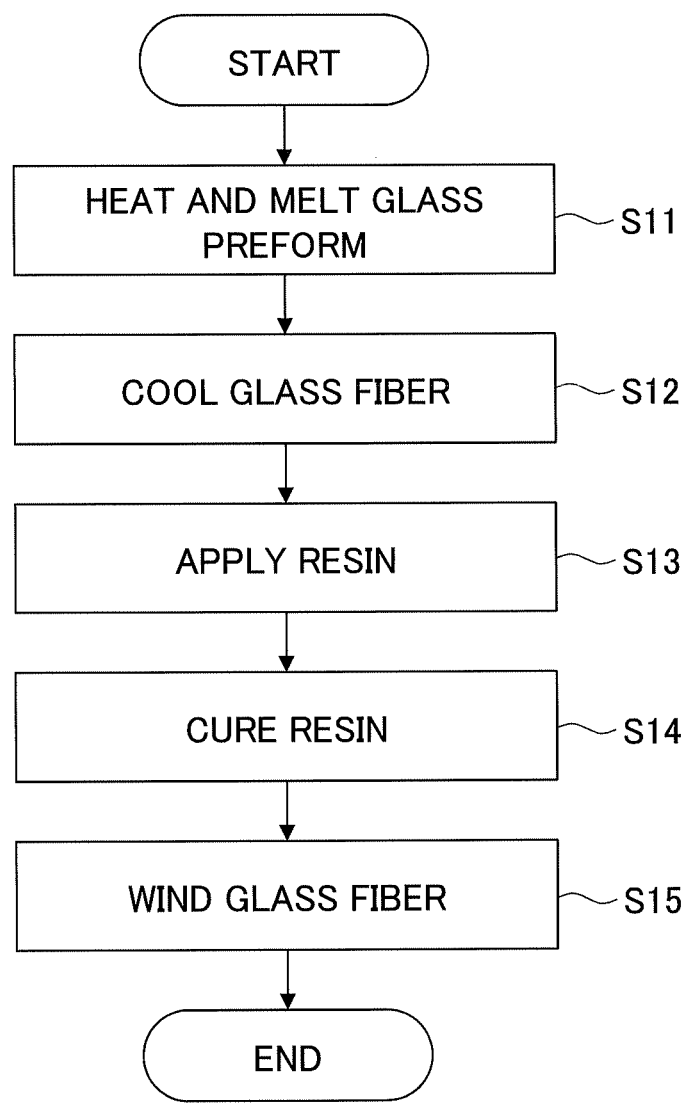
FIG. 6 is a flowchart illustrating an optical fiber manufacturing method according to an embodiment.

FIG. 6 is a flowchart illustrating an optical fiber manufacturing method according to an embodiment. The optical fiber manufacturing method includes a heating and melting process S11, a cooling process S12, a resin applying process S13, & resin curing process S14, and a winding process S15. The above processes are continuously performed, as controlled by the controller 90.

In the heating and melting process S11, a glass preform 2 is heated and melted so as to draw a linear glass fiber 3 from the glass preform 2. In the drawing furnace 10, the linear glass fiber 3 is drawn from the glass preform 2.

In the cooling process S12, immediately after the glass fiber 3 is drawn, the glass fiber 3 is cooled before a resin is applied. The temperature of the glass fiber 3 immediately after drawing is high, and thus, a protective resin cannot be applied to the glass fiber 3 as it is. For this reason, immediately after the glass fiber 3 is drawn, the glass fiber 3 is cooled to a temperature near room temperature by the cooling device 20.

In the resin applying process S13, a resin is applied to the cooled glass fiber 3. Examples of the resin include an ultraviolet curing resin. The resin in the form of liquid is stored in the die 61, and the resin is applied to the outer peripheral surface of the glass fiber 3 when the glass fiber 3 passes through the die 61.

In the resin curing process S14, the resin applied to the glass fiber 3 is cured. For example, when an ultraviolet curing resin is applied, the resin applied to the outer peripheral surface of the glass fiber 3 is cured when the glass fiber 3 passes beside the ultraviolet lamp 66. Note that a thermosetting resin may be used instead of the ultraviolet curing resin.

In the winding process S15, the glass fiber 3 coated by the resin is wound on the winding bobbin 4. The winding bobbin 4 is removably held by the winding bobbin holder 71. The winding motor 72 rotates the winding bobbin holder 71, thereby causing the glass fiber 3 to be wound on the winding bobbin 4.

The cooling process S12 includes a first process of passing the glass fiber 3 through the fiber path 22 of each of cooling tubes 21 housed in the first casing 23. In addition, the cooling process S12 includes a second process of leading the glass fiber 3 into the second casing 110 before leading the glass fiber 3 into the first casing 23. The second process and the first process are sequentially performed in the order from the second process to the first process. The second process and the first process may be repeatedly performed, as controlled by the controller 90.

The first process includes leading the glass fiber 3, which has passed through the second casing 110, into the first casing 23. The first dry space 24 is formed inside the first casing 23. The glass fiber 3 is led into the fiber path 22 after being exposed to an atmosphere in the first dry space 24.

The first process includes supplying the first dry gas whose dew point is lower than the temperature of the cooling tubes 21. Because the dew point of the first dry gas is lower than the temperature(s) of the cooling tubes 21, it is possible to reduce the formation of frost or condensation on the cooling tubes 21 even when the first dry gas is cooled.

The first process includes supplying the first dry gas, having the dew point lower than the temperature(s) of the cooling tubes 21, into the first dry space 24 so as to cause the air pressure P1 in the first dry space 24 to be higher than the air pressure P0 in the external space 6. The differential pressure ΔP1 enables the restriction of the flow of outside air from the external space 6 into the first dry space 24. By restricting the flow of outside air from the external space 6 into the first dry space 24, it is possible to reduce the flow of water vapor from the external space 6 into the first dry space 24, thereby reducing the formation of frost or condensation on the cooling tubes 21.

The second process includes supplying the second dry gas, having the dew point lower than the dew point in the external space 6, so as to cause the air pressure P2 in the second dry space 111 to be higher than the air pressure P0 in the external space 6. Accordingly, it is possible to restrict the flow of outside air from the external space 6 into the second dry space 111. Further, gas carried along with the glass fiber 3 into the second dry space 111 can be replaced by the second dry gas. The dew point of the second dry gas is lower than the dew point in the external space 6. Therefore, the amount of water vapor in the second dry space 111 can be made smaller than the amount of water vapor in the external space 6. Further, the amount of water vapor of gas carried along with the glass fiber 3 from the second dry space 111 into the first dry space 24 can be made smaller than the amount of water vapor in the external space 6. Accordingly, the amount of gas carried along with the glass fiber 3 from the first dry space 24 into the fiber path 22 can be reduced, thereby reducing the formation of frost or condensation in the fiber path 22.

The second process includes supplying the second dry gas, having the dew point lower than the dew point in the external space 6 and lower than the temperature of the cooling tube 21, so as to cause the air pressure P2 in the second dry space 111 to be higher than the air pressure P1 in the first dry space 24. When the air pressure P2 is higher than the air pressure P1, the differential pressure ΔP2 between the air pressure P2 and the air pressure P0 becomes greater than the differential pressure ΔP1. Therefore, it is possible to further restrict the flow of outside air from the external space 6 into the first dry space 24 through the second dry space 111. In order for outside air to flow from the external space 6 into the first dry space 24 through the second dry space 111, the outside air would need to flow against the differential pressure ΔP2 that is greater than the differential pressure ΔP1. As described above, because the air pressure P2 is higher than the air pressure P1, the second dry gas flows from the second dry space 111 into the first dry space 24, thus increasing the air pressure P1 in the first dry space 24. Accordingly, the differential pressure ΔP1 between the air pressure P1 in the first dry space 24 and the air pressure P0 in the external space 6 can be increased, and thus, the flow of outside air from the external space 6 into the first dry space 24 through gaps between members constituting the first casing 23 can be reduced. Further, the dew point of the second dry gas is lower than the temperature of the cooling tube 21. Therefore, even when the second dry gas flows into the first dry space 24 and is cooled by the cooling tube 21, frost or condensation does not occur.

[First Variation]

Figure 7:
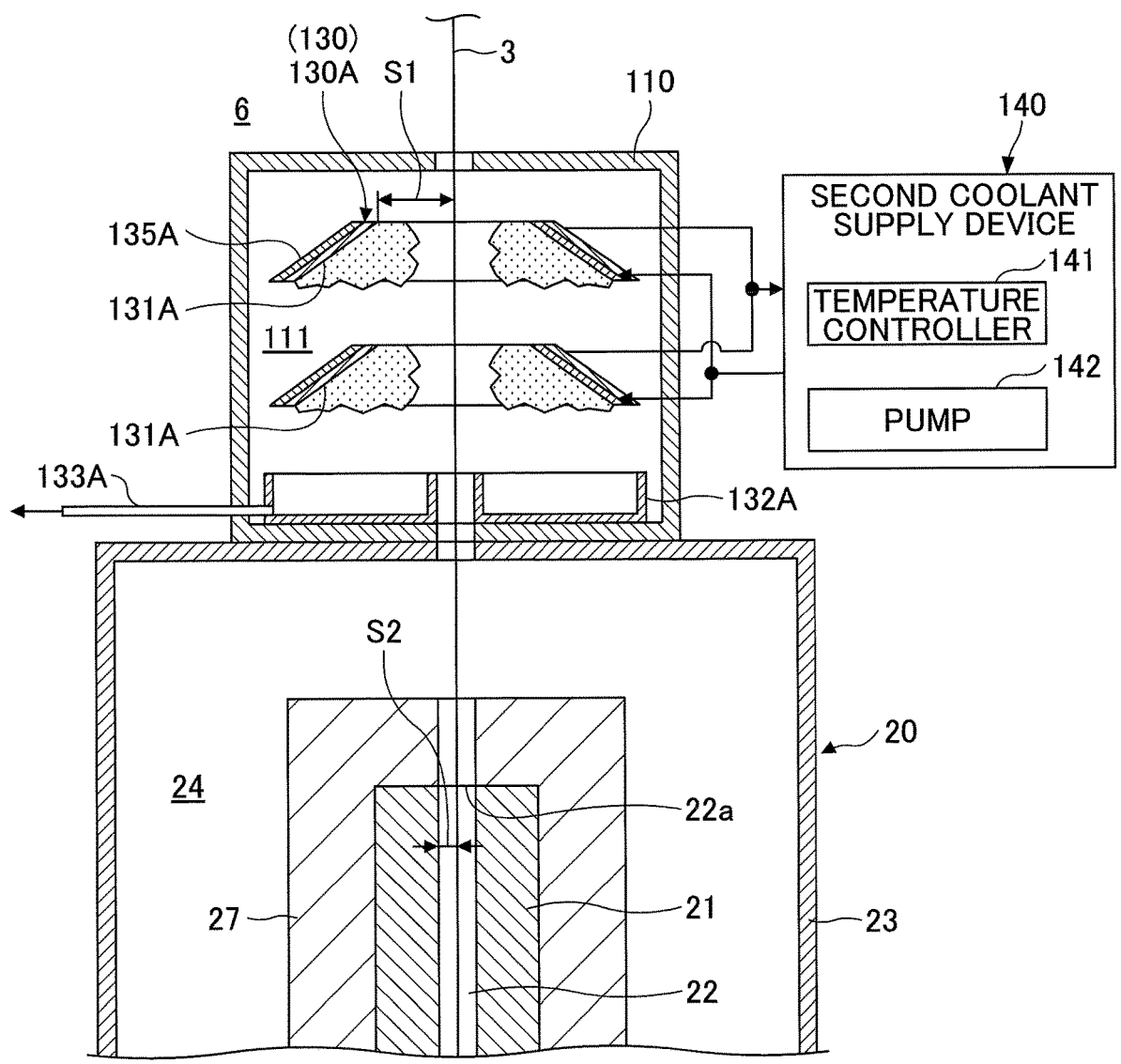
FIG. 7 is a diagram illustrating a main part of an optical fiber manufacturing apparatus according to a first variation.

FIG. 7 is a diagram illustrating a main part of an optical fiber manufacturing apparatus according to a first variation. The optical fiber manufacturing apparatus according to the first variation includes an adsorber 130 in place of the second dry gas supply device 120. Mote that the adsorber 130 may be, of course, used in combination with the second dry gas supply device 120.

The adsorber 130 is disposed in the second dry space 111, and adsorbs water vapor carried along with the glass fiber 3 from the external space 6 into the second dry space 111. Accordingly, similar to the above-described embodiment, the amount of water vapor in the second dry space 111 can be made smaller than the amount of water vapor in the external space 6, and the amount of water vapor of gas carried along with the glass fiber 3 from the second dry space 111 into the first dry space 24 can be made smaller than the amount of water vapor in the external space 6. Accordingly, the amount of gas carried along with the glass fiber 3 from the first dry space 24 into the fiber path 22 can be reduced, thereby reducing the formation of frost or condensation in the fiber path 22.

The adsorber 130 may be a cooler 130A cooled by a second coolant, for example. The cooler 130A converts water vapor (gas) into ice (solid) or water (liquid) by cooling the water vapor carried along with the glass fiber 3 from the external space 6 into the second dry space 111, thereby adsorbing the water vapor. The distance S1 between the cooler 130A and the glass fiber 3 is larger than the distance S2 between the inner peripheral surface of a cooling tube 21 and the glass fiber 3. Therefore, it is possible to prevent the glass fiber 3 from contacting ice or water adsorbed on the cooler 130A.

For example, the cooler 130A includes an inclined plate 131A that is inclined downward away from the glass fiber 3 in the horizontal direction. Water can be dropped by gravity along the inclined plate 131A. Further, ice adsorbed on the inclined plate 131A melts into water when the supply of the second coolant to the inclined plate 131A is stopped.

The optical fiber manufacturing apparatus according to the first variation includes a receiver 132A in the second dry space 111. The receiver 132A is disposed below the cooler 130A to collect water flowing down from the cooler 130A. A discharge pipe 133A is connected to the receiver 132A. The water collected in the receiver 132A passes through the discharge pipe 133A, and is discharged to the outside of the second dry space 111.

The optical fiber manufacturing apparatus according to the first variation may include a heater 135A that heats the cooler 130A. Examples of the heater 135A include an electric heater. The time required to melt ice adsorbed on the cooler 130A can be reduced by heating the cooler 130A. It is also possible to convert water adsorbed on the cooler 130A into water vapor, and desorb the water vapor from the cooler 130A. For example, the heater 135A heats the cooler 130A when the manufacturing of optical fibers is being stopped, such as when the glass preform 2 is being replaced. Accordingly, it is possible to remove ice or water from the cooler 130A, and reduce the contact between the glass fiber 3 and ice or water adsorbed on the cooler 130A.

The optical fiber manufacturing apparatus according to the first variation includes a second coolant supply device 140 that supplies the second coolant to the cooler 130A. The second coolant supply device 140 is configured in a similar manner to the first coolant supply device 30. The second coolant supply device 140 includes a temperature controller 141 and a pump 142. The temperature controller 141 controls the temperature of the second coolant, and the pump 142 supplies the second coolant to the cooling tube 21. Examples of the second coolant include a coolant that is in a liquid phase at a temperature ranging from at least −70° C. or more to room temperature (for example, 20° C.) or less. Specific examples of the second coolant include perfluoropolyether.

The second coolant is cooled to a set temperature by the temperature controller 141, and is then supplied to the cooler 130A by the pump 142. The second coolant is returned to the second coolant supply device 140 after absorbing heat transferred to the coder 130A. Then, the second coolant is cooled to the set temperature again by the temperature controller 141, and is supplied to the cooler 130A by the pump 142.

The controller 90 controls the temperature of the second coolant that cools the cooler 130A, such that the temperature of the cooler 130A is lower than the temperature of the cooling tube 21. The controller 90 sets the temperature of the second coolant to be lower than the temperature of the first coolant. The temperature difference ΔT between a set temperature T1 of the first coolant and the set temperature T2 of the second coolant (ΔT=T1−T2) is, for example, more than 0° and less than or equal to 40° C.

In the second dry space 111, the dew point of gas carried along with the glass fiber 3 is reduced to approximately the same temperature as the temperature of the cooler 130A. The temperature of the cooler 130A is lower than the temperature of the cooling tube 21. Accordingly, the dew point of gas carried along with the glass fiber 3 into the second dry space 111 can be made lower than the temperature of the cooling tube 21, and also the dew point of gas subsequently carried along with the glass fiber 3 into the first dry space 24 can be made lower than the temperature of the cooling tube 21. Accordingly, the dew point of gas carried along with the glass fiber 3 from the first dry space 24 into the fiber path 22 can be made lower than the temperature of the cooling tube 21, thereby reducing the formation of frost or condensation in the fiber path 22.

A cooling process S12 according to the first variation differs from the cooling process S12 according to the above-described embodiment. The cooling process S12 according to the first variation includes causing the adsorber to adsorb water vapor in the second dry space 111, instead of supplying the second dry gas into the second dry space 111. Accordingly, similar to the above-described embodiment, the amount of water vapor in the second dry space 111 can be made smaller than the amount of water vapor in the external space 6, and the amount of water vapor of gas carried along with the glass fiber 3 from the second dry space 111 into the first dry space 24 can be made smaller than the amount of water vapor in the external space 6. Accordingly, the amount of water vapor of gas carried along with the glass fiber 3 from the first dry space 24 can be reduced, thereby reducing the formation of frost or condensation in the fiber path 22.

Note that the cooling process S12 according to the first variation can obviously include both supplying the second dry gas into the second dry space 111 and causing the adsorber disposed in the second dry space 111 to adsorb water vapor in the second dry space 111.

[Second Variation]

Figure 8:
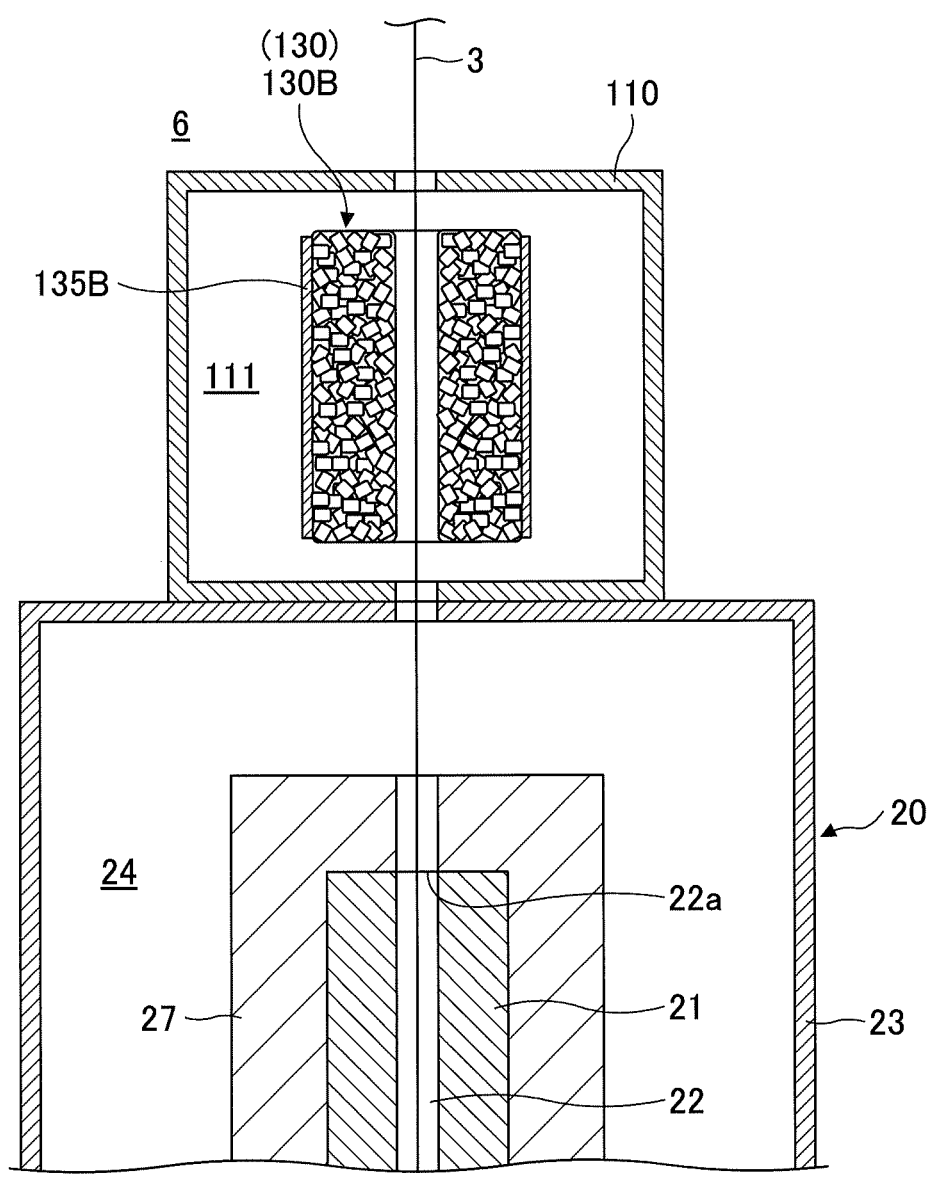
FIG. 8 is a diagram illustrating a main part of an optical fiber manufacturing apparatus according to a second variation.

FIG. 8 is a diagram illustrating a main part of an optical fiber manufacturing apparatus according to a second variation. The optical fiber manufacturing apparatus according to the second variation includes an adsorbent 130B, which serves as the adsorber, instead of the cooler 130A. The adsorbent 130B is made of a porous material. Note that the adsorbent 130B can be, of course, used in combination with the cooler 130A. Further, the adsorbent 130B can be, of course, used in combination with the second dry gas supply device 120.

The adsorbent 130B includes pores that adsorb water vapor carried along with the glass fiber 3 from the external space 6 into the second dry space 111. When the adsorbent 130B is used, it is possible to eliminate the necessity of cooling, thus allowing water vapor t;o be more readily adsorbed.

The adsorbent 130B may be silica gel, alumina gel, zeolite, or activated carbon, for example. The adsorbent 130B may be granular, and the granular adsorbent 130B may be placed in a net. Instead of the net, the granular adsorbent 130B may be placed on a receiver.

The optical fiber manufacturing apparatus includes s heater 135B that heats the adsorbent 130B. Examples of the heater 135B include an electric heater. By heating the adsorbent 130B, water vapor can be desorbed from the adsorbent 130B. The water vapor desorbed from the adsorbent 130B is discharged into the external space 6. for example, the heater 135B heats the adsorbent 130B when the manufacturing of optical fibers is being stopped, such as when the glass preform 2 is being replaced. By heating the adsorbent 130B, it is possible to minimize a decrease in the adsorption amount of the adsorbent 130B.

Similar to the cooling process S12 according to the first variation, a cooling process S12 according to the second variation includes causing the adsorber to adsorb water vapor in the second dry space 111. The cooling process S12 according to the second variation is the same as the cooling process S12 according to the first variation, and thus, an illustration and a description thereof will not be repeated.

Although specific embodiments have been described above, the present disclosure is not limited to the above-described embodiments. Variations, modifications, substitutions, additions, omissions, and combinations can be made to the described subject matter without departing from the scope of the present invention, and it is to be understood that such variations, modifications, substitutions, additions, omissions, and combinations obviously belong in the technical scope of the present invention.

What is claimed is:

1. An optical fiber manufacturing method comprising:
   a first process of passing a glass fiber through a fiber path, the glass fiber being drawn from a glass preform, the fiber path being formed through a cooling tube, and the cooling tube being housed in a first casing and being cooled by a first coolant; and
   a second process of leading the glass fiber into a second casing before leading the glass fiber into the first casing,
   wherein the first process includes supplying a first dry gas into a first dry space formed between the first casing and the cooling tube, a dew point of the first dry gas being lower than a temperature of the cooling tube,
   the second process includes supplying a second dry gas into a second dry space foiiiied inside the second casing so as to cause a second air pressure in the second dry space to be higher than a third air pressure in an external space of the first casing and the second casing, a dew point of the second dry gas being lower than a dew point in the external space,
   the first casing is in contact with the second casing,
   a drawing speed of the glass fiber is 1000 m/min or more,
   the first process includes supplying the first dry gas into the first dry space so as to cause a first air pressure in the first dry space to be higher than the third air pressure in the external space, the dew point of the first dry gas being lower than the temperature of the cooling tube, and
   the second process includes supplying the second dry gas into the second dry space so as to cause the second air pressure in the second dry space to be higher than the first air pressure in the first dry space, the dew point of the second dry gas being lower than the dew point in the external space and the temperature of the cooling tube.

2. An optical fiber manufacturing method comprising:
   a first process of passing a glass fiber through a fiber path, the glass fiber being drawn from a glass preform, the fiber path being formed through a cooling tube, and the cooling tube being housed in a first casing and being cooled by a first coolant; and
   a second process of leading the glass fiber into a second casing before leading the glass fiber into the first casing,
   wherein the first process includes supplying a first dry gas into a first dry space formed between the first casing and the cooling tube, a dew point of the first dry gas being lower than a temperature of the cooling tube, and
   the second process includes causing an adsorber disposed in the second dry space to adsorb water vapor carried along with the glass fiber from the external space of the first casing and the second casing into the second dry space of the second casing.

3. The optical fiber manufacturing method according to claim 2, wherein the second process includes
   causing a cooler, serving as the adsorber, to cool and adsorb the water vapor carried along with the glass fiber from the external space into the second dry space, and
   controlling a temperature of a second coolant that cools the cooler, so as to cause a temperature of the cooler to be lower than the temperature of the cooling tube.

4. The optical fiber manufacturing method according to claim 2, wherein the second process includes causing an adsorbent made of a porous material, serving as the adsorber, to adsorb water vapor carried along with the glass fiber from the external space into the second dry space.

* * * * *